Patented Feb. 5, 1935

1,989,830

UNITED STATES PATENT OFFICE 1,989,830

PROCESS FOR REMOVING WASTE MATERIALS FROM MICA AND VERMICULITE

Julius T. Stroehlke, Silver Cliff, Colo.

No Drawing. Application March 15, 1934,
Serial No. 715,746

4 Claims. (Cl. 252—8)

This invention relates to a process for removing waste materials from mica and vermiculite.

An object of the invention is a process for removing waste materials from mica and vermiculite by a solution containing a cyanide.

An object of the invention is the provision of a process for removing impurities from mica and vermiculite by use of a solution containing a cyanide and an acid which dissolves besides other impurities coating the mica and vermiculite, iron oxides and magnesium lime.

Another object of the invention is the provision of a process for removing foreign matter from mica and vermiculite in which the crude mica ore is subjected to the action of a solution so that mica is freed from the impurities that have a greater specific gravity than the freed mica, whereby it is possible to readily separate the mica from the waste by any well known mechanical means such as classifiers, concentrator tables, and jigs.

This invention will be best understood from a consideration of the following detailed description; nevertheless, it is to be understood that the invention is not confined to the disclosure, being susceptible of such changes and modifications as define no material departure from the salient features of the invention as expressed in the appended claims.

In carrying out my process it is found that it is important that the mica or refined vermiculite does not split into scales or laminae when the crude ground ore is aggregated into small lumps during the chemical action of solutions which remove impurities from the mica. After the crude ground mica ore has been subjected to the action of a chemical solution for a predetermined period and foreign matter has been removed from the mica, the solution is withdrawn and retained for treatment of other mica ores. Before the withdrawn solutions are employed again sufficient chemicals are added to the solution to bring them to a predetermined standard which is necessary for the removal of the impurities.

The ore to be treated is a micaceous crude ore in which the mica is encased or coated with magnesia, lime and like films of an oxide or iron. Other impurities are also included in the coatings and films but of a percentage which is much less than the magnesia and lime or the iron oxide. However, the solution dissolves not only the magnesia and lime and iron oxide but the other impurities so that the mica when obtained is free of impurities.

The crude mica ore is slightly crushed either with or without a solution of potassium cyanide and acetic acid. As has been stated the ore has been slightly crushed so that the pieces of the ore will be approximately the natural size of the foliate of the mica as it comes from the mines. This ore is then passed over a sieve which may be anywhere from eight to a thirty mesh screen to remove the smaller particles. The crushed mica ore is then conveyed to the chemical treating tanks and remains in a specially prepared solution for a period from thirty minutes to four hours. The time, however, depends largely upon the amount of magnesia and lime in the crude ore. As has been stated, the film of iron oxide is considerably less in quantity as compared to the magnesia and lime so that the time required for the removal of the magnesia and lime will be sufficient to also remove the iron oxide and other impurities.

There are two solutions which may be employed and one, indicated at A, is as follows:

| | Pounds |
|---|---|
| Water | 2,000 |
| Acetic acid | 50 |
| Potassium cyanide | 2 |

Solution A will give excellent results in about one and a half hours and is used preferably because of the fact that the solution removes the foreign matter from the mica in less time than the following solution which is indicated as B:

| | Pounds |
|---|---|
| Water | 2,000 |
| Potassium cyanide | 2 |

Solution B gives excellent results but it requires approximately twice as long for the solution to remove the impurities but on the other hand where time is not an essential element it is found that solution B is much cheaper to operate.

The sized crude mica ore is placed in the tanks containing either solution in the following proportions: For every one part crude mica ore three parts of either solution may be employed and the ore may remain in the tank for a period of from one and a half hours to three hours.

If desired, any mechanical means may be employed for agitating the ore in the solution. The foreign matter which consists principally of magnesium lime and iron oxide adhere to the mica and is dissolved by the solution. The solution is pumped out of the tanks and conducted to storage tanks and this solution may be used again after the required amount of the compounds employed are added to the solution in order to bring the solution to the requirements set forth for either solution A or solution B. After the solution has been pumped out of the desiccating tanks there remains the mica and solids which are separated from the mica by any well known mechanical means such as classifiers, concentrator tables, jigs, or other separating machinery now on the market.

During the stage of separating the mica from the solids or waste matter, three parts of water are added in order to flush the mica free of particles. When the micaceous crude ore is treated with the weak solution of the potassium cyanide or the weak solution of potassium cyanide and acetic acid, the impurities on the mica which are principally lime magnesia and iron oxide are removed.

I claim:

1. The process for removing impurities from mica which comprises treating crude mica ore with a solution of potassium cyanide.

2. The process for removing impurities from mica which comprises treating crude mica ore with a solution of potassium cyanide and acetic acid.

3. The process for removing impurities from mica which comprises treating crude mica ore with a solution of potassium cyanide, the solution containing two thousand parts of water and two parts of potassium cyanide.

4. The process for removing impurities from mica which comprises treating crude mica ore with a solution containing two thousand parts of water, fifty parts of acetic acid and two parts of potassium cyanide.

JULIUS T. STROEHLKE.